US008312518B1

(12) United States Patent
Ezell et al.

(10) Patent No.: US 8,312,518 B1
(45) Date of Patent: Nov. 13, 2012

(54) ISLAND OF TRUST IN A SERVICE-ORIENTED ENVIRONMENT

(75) Inventors: Joel M. Ezell, Broomfield, CO (US); Manish Gaur, Pleasanton, CA (US); Richard J. Pennenga, East Windsor, NJ (US); Andrew Zmolek, Highlands Ranch, CO (US)

(73) Assignee: Avaya Inc., Basking Ridge, NJ (US)

( * ) Notice: Subject to any disclaimer, the term of this patent is extended or adjusted under 35 U.S.C. 154(b) by 884 days.

(21) Appl. No.: 11/862,849

(22) Filed: Sep. 27, 2007

(51) Int. Cl.
*G06F 7/04* (2006.01)
*G06F 15/16* (2006.01)
*G06F 17/30* (2006.01)
*H04L 29/06* (2006.01)

(52) U.S. Cl. ..................... 726/6; 726/4; 726/5

(58) Field of Classification Search .......... 380/277–286, 380/44–47, 29–30; 713/155–157, 171, 173, 713/175–176, 180, 193–194
See application file for complete search history.

(56) References Cited

U.S. PATENT DOCUMENTS

| 5,796,839 | A | * | 8/1998 | Ishiguro | 380/44 |
|---|---|---|---|---|---|
| 6,359,573 | B1 | * | 3/2002 | Taruguchi et al. | 341/50 |
| 6,615,350 | B1 | * | 9/2003 | Schell et al. | 713/168 |
| 6,738,907 | B1 | * | 5/2004 | Carter | 726/9 |
| 7,107,247 | B2 | * | 9/2006 | Kinoshita et al. | 705/64 |
| 7,359,517 | B1 | * | 4/2008 | Rowe | 380/284 |
| 7,454,021 | B2 | * | 11/2008 | Reddy et al. | 380/282 |
| 7,636,783 | B2 | * | 12/2009 | Heutchy et al. | 709/227 |
| 7,639,820 | B2 | * | 12/2009 | Saito | 380/287 |
| 7,669,238 | B2 | * | 2/2010 | Fee et al. | 726/22 |
| 7,747,856 | B2 | * | 6/2010 | Favazza et al. | 713/168 |
| 2001/0014157 | A1 | * | 8/2001 | Hashimoto et al. | 380/278 |
| 2004/0153661 | A1 | * | 8/2004 | Graunke | 713/200 |
| 2006/0107327 | A1 | * | 5/2006 | Sprigg et al. | 726/26 |
| 2006/0195689 | A1 | * | 8/2006 | Blecken et al. | 713/156 |
| 2007/0150723 | A1 | * | 6/2007 | Estable et al. | 713/155 |
| 2007/0150744 | A1 | * | 6/2007 | Cheng et al. | 713/185 |
| 2007/0180509 | A1 | * | 8/2007 | Swartz et al. | 726/9 |
| 2007/0234042 | A1 | * | 10/2007 | Gantman et al. | 713/156 |
| 2008/0209213 | A1 | * | 8/2008 | Astrand et al. | 713/168 |
| 2009/0055642 | A1 | * | 2/2009 | Myers et al. | 713/155 |
| 2009/0064279 | A1 | * | 3/2009 | Ardolino | 726/3 |
| 2009/0106551 | A1 | * | 4/2009 | Boren et al. | 713/158 |

* cited by examiner

*Primary Examiner* — Eleni Shiferaw
*Assistant Examiner* — Jing Sims
(74) *Attorney, Agent, or Firm* — Sheridan Ross P.C.

(57) ABSTRACT

The present invention is directed to establishing an island of trust using credentials issued by a manufacturer or service provider and protecting the credentials by embedding them in application code.

19 Claims, 5 Drawing Sheets

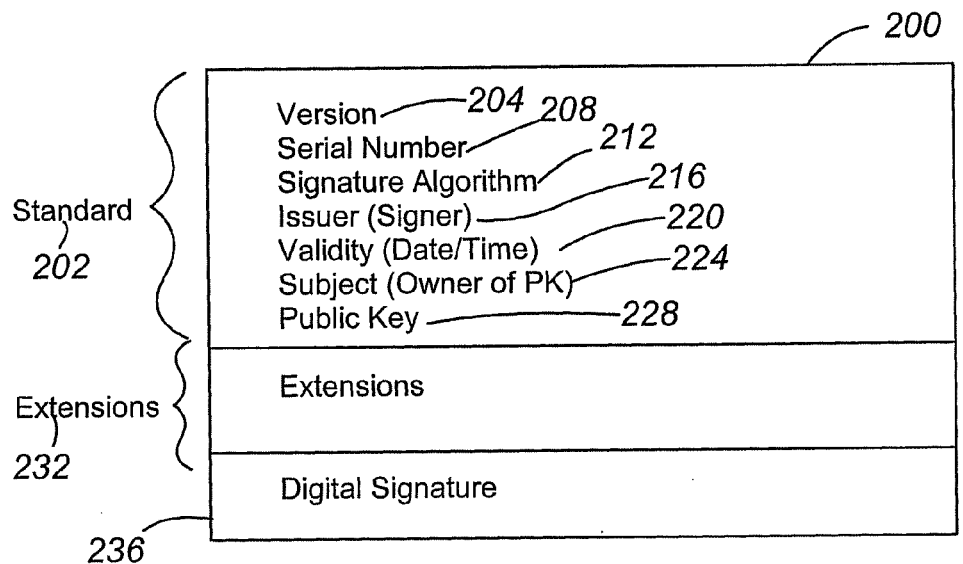
Fig. 2
(PriorArt)

ISLAND OF TRUST IN A SERVICE-ORIENTED ENVIRONMENT

CROSS REFERENCE TO RELATED APPLICATION

Cross reference is made to U.S. patent application Ser. No. 10/956,861, filed Sep. 30, 2004, entitled "Certificate Distribution Via License Files", which is incorporated herein by this reference in its entirety.

FIELD OF THE INVENTION

The invention relates generally to identifying trusted entities and particularly to providing privileges to trusted entities in service-oriented environments.

BACKGROUND OF THE INVENTION

Distributed software systems that operate over an open network, particularly a Wide Area Network such as the Internet, often have the need for secure communications over the network and authentication between system elements to prevent spoofing and other security breaches. Various protocols have been used to provide such security. Exemplary protocols include the Secure Sockets Layer or SSL, Transport Layer Security or TLS, Secure-HTTP, and IP Security or IPSEC.

Instrumental in these protocols are cryptographic mechanisms. Two primary cryptographic mechanisms are secret key and public key cryptography. Secret key is a type of symmetric encryption in which both parties know and use the same or shared secret key to encrypt and decrypt communications. Encryption algorithms, or ciphers, based on the secret key, mathematically transform or encrypt the plain text in the message into cipher text. The same key and algorithm are used by the other party to decrypt the cipher text. Public key cryptography is a type of asymmetric encryption that uses pairs of different keys, one for encryption and one for decryption. One of the keys or private key is kept secret by a party and the other key or public key is provided freely to other parties. When plain text is converted into ciphertext or encrypted using the private key, it may be converted back into plain text only using the public key and vice versa. The Rivest-Shamir-Adleman or RSA algorithm is one of the most widely used public key algorithms.

The SSL protocol uses the Public Key Infrastructure or PKI, a form of public key cryptography, to secure communications over otherwise unsecured networks. RSA, together with the X.509 standard for digital certificates, form the basis of PKI. A certificate 200 according to the X.509 standard is shown in FIG. 2. The standard portion 202 of X.509 includes the version 204 (which indicates the particular version of the X.509 standard), serial number 208 (which is assigned by the certificate authority and uniquely identifies the certificate), signature algorithm 212 (which identifies the algorithm used to generate the digital signature), issuer or signer 216 of the certificate (which identifies the certificate authority that issued the certificate), period of validity 220 for the certificate (which identifies both the earliest and latest times that the certificate is valid), the subject or owner 224 of the public key, and the public key 228 of the owner of the certificate. Extensions 232 provide a location for issuers to add their own private information to the certificate. It can include authority and subject key identifiers, key usage, private key usage period, and a list of permitted use and restrictions on usage for the certificate. The certificate 200 further includes the digital signature field 236 (encrypted using the private key of an issuing entity). The digital signature field is deduced based on the signature algorithm identifier 212, and created by a secure hash of the other fields in the certificate and an encryption of that hash using the issuer's private key. When a certificate has been issued and signed by the same entity, that certificate is known as a self-signed certificate or a root certificate. In a certificate chain or chain of trust, a root certificate is always at the top of the chain and is used to validate each of the other lower certificates in the chain. A trusted third-party, such as Verisign™, that issues digital certificates is known as a Certificate Authority or CA. As can be seen from the foregoing, to implement PKI each system element in the distributed network requires a unique digital certificate and associated private key.

Providing each system element with a unique certificate can be achieved by secure communications between the system element and a certificate authority. In this approach, the system element generates a public/private key set and makes a certificate request to the certificate authority. Secure distribution of the private key is not an issue because no distribution is needed (the private key is generated on the target system element and not required as input by any other system).

In service-oriented customer environments, it is often desirable to create an island of trust to allow certain trusted consumers of the service to obtain access to special rights and privileges. The island of trust must not only be difficult to compromise by third parties but also, in many applications, by administrators of customers. For example, a service may wish to allow only certain trusted consumers of the service to obtain access to discounted or free licenses or rights to use specified software. The service consumer must somehow be authenticated, and the mechanism used to authenticate the consumer must not be something that an administrator can use to take advantage of the discounted licenses for other applications or other consumers.

In most applications, existing authentication protocols cannot provide an island of trust. Such systems do permit authentication of services and service consumers; however, the same system cannot be used to identify whether or not a consumer is entitled to a special right or privilege or the administrator could identify any application as trusted to obtain the right or privilege. The authentication mechanism needs to be controlled completely by the publisher of the service.

While secret handshakes can be employed, they can fail to provide a robust solution. A secret handshake refers to the client and server sharing an algorithm for hashing or the like. The client, by successfully indicating knowledge of the handshake algorithm, establishes to the server that the client can be trusted. However, if the algorithm is compromised a new handshake algorithm must be devised, and all clients and servers must be updated with the new algorithm.

SUMMARY OF THE INVENTION

These and other needs are addressed by the various embodiments and configurations of the present invention. The present invention is directed generally to providing an "island of trust" between unrelated entities over a public or untrusted network.

In an embodiment of the present invention, a method includes the steps of:

(a) retrieving, at a first computational component, a private key embedded in code of a first application;

(b) generating, at the first computational component, a request for access to a right and/or privilege, the request being digitally signed with the private key of the requestor; and (c) sending the digitally signed request to a second computational component along with the digital certificate issued to the requestor. The right and/or privilege can be to or for information, a service, a product, an upgrade or modification, a price reduction or discount, a right of use, a permission or authorization, and the like.

In one configuration, the private key is preferably encrypted using a second key and located in the code of the first application in its encrypted form. The second key can be embedded and hidden elsewhere in the code of the first application. In this manner, the private key is difficult to compromise.

The embodiment uses credentials (e.g., a key store or other substantially equivalent abstraction) embedded securely within code in an untrusted environment to establish a trusted link. The credentials are embedded in application code with attendant obfuscation inherent to the credentials. This can be a portable methodology or logic (regardless of how and where it is installed in a relevant platform) to establish transparently trust with between peer applications in a security realm. The security realm is generally not the entity having the application code but that of another entity or set of entities. The trust realm is thus controlled by the other entity or set of entities.

In one configuration, the first and second computational components are part of a common enterprise network, such as the premises of a customer of a service and/or product provider. The components are secured with third party issued public key credentials of the customer's choice. The island of trust is created within the customer's enterprise network. The various components in the enterprise network may be interconnected over a public and/or untrusted network.

In another configuration, the second computational component is associated with a service and/or product provider, and the first computational component with a customer of the service and/or product provider. The customer is requesting a service, product, or function offered by the provider.

In this configuration, the first computational component, or a sub-component thereof (such as the first application), has a client certificate issued by an issuing authority associated with the service and/or product provider and digitally signed by a private key of the issuing authority. The client certificate can be embedded, along with the corresponding private key in the code of the first application. A chain of trust is established in which the client credentials include not only the client certificate but also a root certificate of the service and/or product provider digitally signed by a private key of the service and/or product provider, and an issuing authority certificate digitally signed by the private key of the service and/or product provider. The provider's private key, issuing authority's private key, and first computational component's private key are different from one another. In this manner, the provider effectively controls the island of trust while the customer controls with whom it establishes a trusted relationship using a public certificate and private key pair issued by a third party other than the provider (e.g., Verisign). The former is used to establish the island of trust, and the latter to establish a secure session over the untrusted network.

In yet another configuration, the client certificate is issued to the first application, and a subject field of the client certificate includes an attribute of the first application and/or an output of the first application.

When the request is received, the second computational component can perform the following steps:

validating that the client certificate associated with the first computational component was validly issued by the issuing authority;

validating that an identity associated with the first computational component is not prohibited from receiving the requested access;

optionally validating that a timestamp associated with the request is recent relative to a time of receipt of the request; and validating that a digital signature in the request was signed with the private key of the product provider.

If validation fails, access to the requested access is denied.

The present invention can provide a number of advantages depending on the particular configuration. By way of example, because the provider is the issuing authority, the certificate creation and validation process does not require the involvement of a recognized issuing authority, such as Verisign, thereby potentially avoiding substantial costs and delays in provisioning computational components. The invention can use industry standards (e.g., digital signature, and certificates) in a unique way to establish a separate identity for customer applications and thereby an island of trust. Embedding credentials in application code can provide a high degree of security.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

A "digital certificate" or "certificate" is an electronic passport including a numerical pattern, value, or key and used for entity identification. Creating a digital certificate commonly involves a user identifying a specific personal trait or attribute to a trusted third party, which issues the certificate. An example of a digital certificate is defined by the X.509 standard.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

A "digital signature" refers to encrypted data, appended to or part of a message that enables a recipient to prove or otherwise establish the identity of the sender. A digital signature is commonly encrypted with a private or secret key. The recipient decrypts the signature with the corresponding public key to verify that the digital signatory has the correct private key. The digital signature is normally not sent alone because an untrustworthy entity could simply copy the encrypted version. Instead, the signature is normally sent as part of an abstract (or manifest or digest) of a particular message. The recipient can also check to ensure that the hash function given in the manifest matches the hash function computed from the message.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

FIG. 2 depicts the format of a digital certificate;

DETAILED DESCRIPTION

Figure 1:
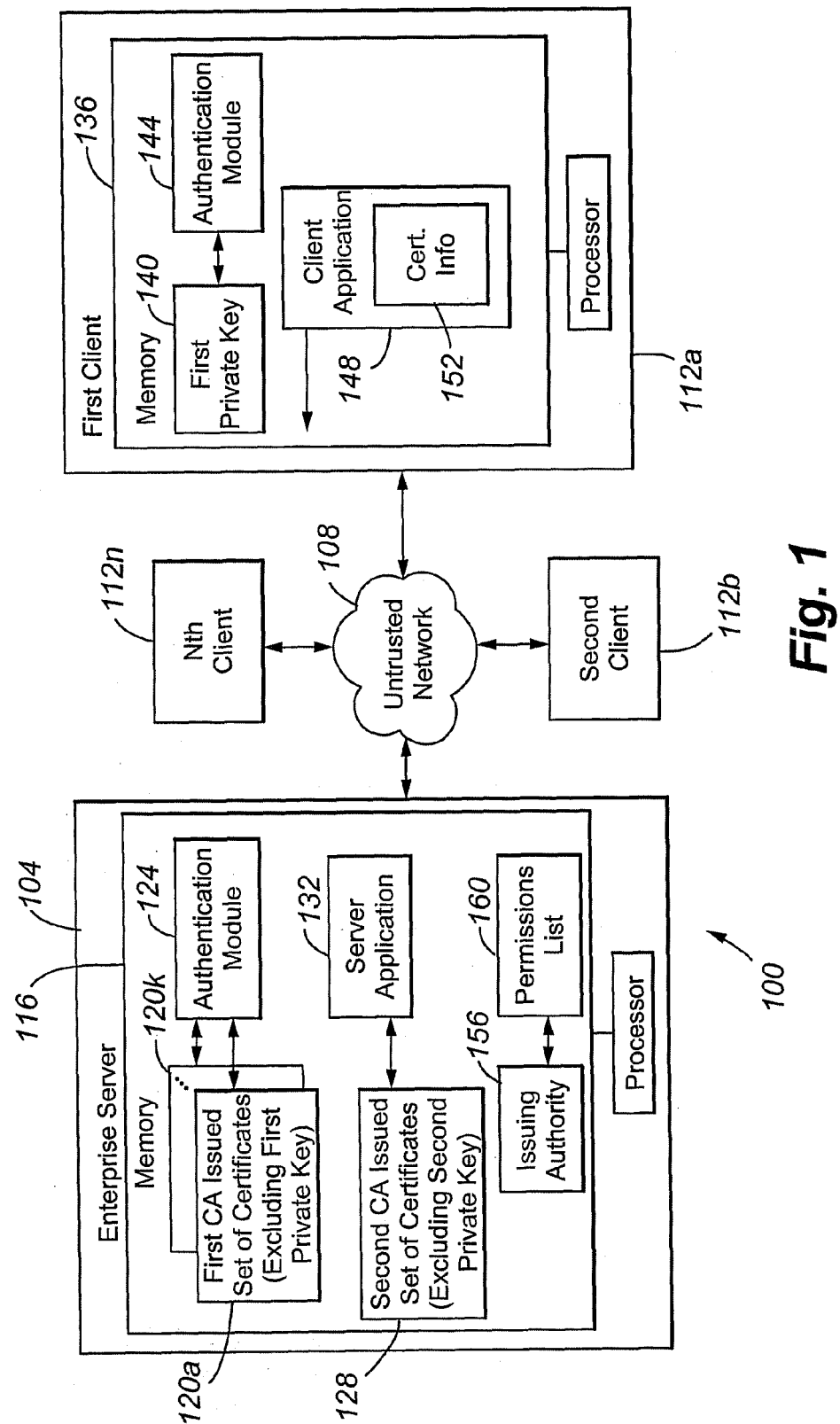
FIG. 1 is a block diagram of an architecture according to a first embodiment of the present invention.

An embodiment of the invention will be described with reference to FIG. 1.

The architecture 100 includes an enterprise server 104 in communication, via untrusted network 108, with a plurality of first, second, . . . nth clients 112a-n. The enterprise server 104 is commonly associated with an enterprise that is a service provider, distributor, or manufacturer, (collectively "provider enterprise") and the client's 112a-n with customers or consumers of the provider enterprise. Accordingly, the various enterprises associated with the enterprise server 104 and each of the client's 112a-n are frequently independent from or unrelated to one another. Although the embodiment is discussed with reference to a client-server architecture, it is to be understood that other network architectures, such as peer-to-peer architectures, can be used with the present invention.

The enterprise server and first, second, . . . nth clients are preferably computers or computational devices. The server 104 provides services to the clients. The computers can be any types of machines capable of executing instructions on data. Commonly, each computer is able to store its own instructions and includes a memory and central processing unit or processor.

The untrusted network 108 can be any packet-switched network, with the Internet being illustrative.

Figure 6:
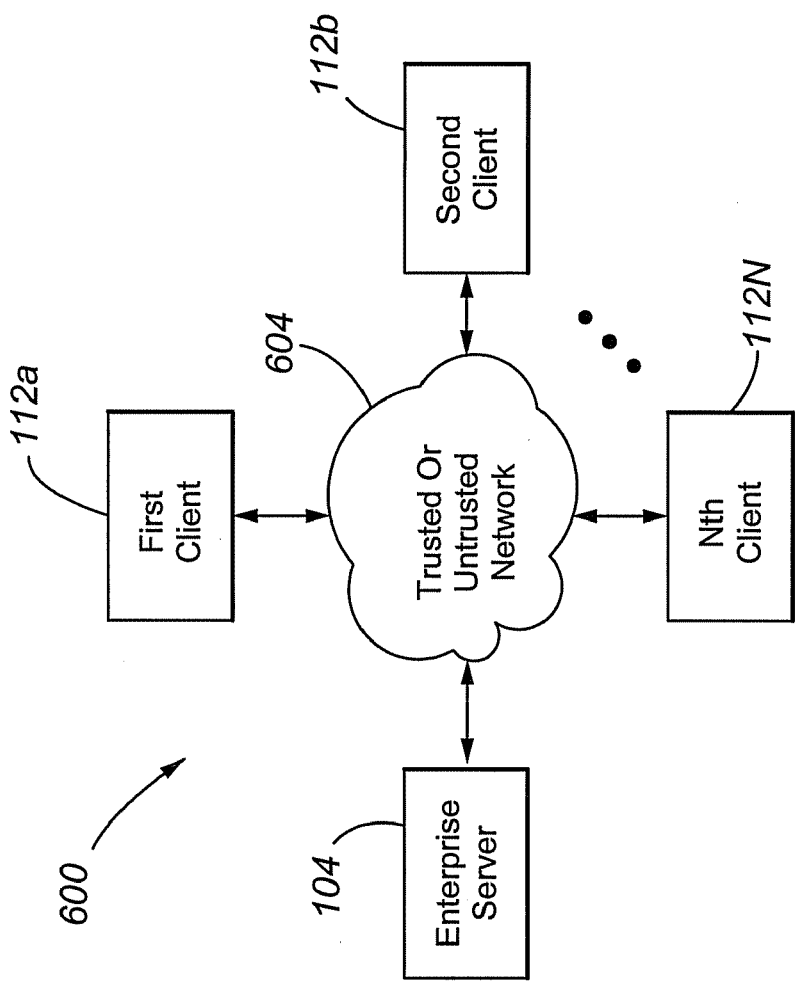
FIG. 6 is a block diagram of an architecture according to a second embodiment of the present invention.

FIG. 6 depicts an architecture according to another embodiment. The architecture 600 includes the first, second, . . . nth clients 112a-n and the enterprise server 104, all interconnected by a trusted or untrusted network 604 or combination thereof. In this embodiment, the first, second, . . . nth clients 112a-n and enterprise server 104 are part of a common enterprise network and are secured by first CA-issued public key credentials controlled by the enterprise network administrator. The administrator is commonly a customer of the provider enterprise. The provider enterprise creates the "island of trust" described herein within the customer's enterprise network.

Included within the memories of the computers are a number of functional modules and data.

The memory 116 of the enterprise server 104 includes first Certificate Authority ("CA") issued sets of certificates 120a-k, a (server-side) authentication module 124, second CA issued set of certificates 128, server application 132, issuing authority (or second CA) 156, and permissions list 160. The first sets of CA issued certificates each include a chain of trust having a root certificate issued by the first CA and a digital certificate digitally signed by the first CA while the second CA issued set of certificates includes a chain of trust having a root certificate issued by the second CA and a digital certificate issued or signed by a second CA (which is different from the first CA). When the clients are part of the same enterprise network there will be fewer sets of first CA certificates than there are client devices but only one set of second CA issued certificates. This is so because the entity authenticated by the second set of certificates is not the client itself but the client application 148. When the clients are associated with different enterprise networks, each set of the first CA issued certificates is unique, and each client has separate sets of first CA issued certificates. More typically, in that event there will only be one each set of first and second CA issued certificates, and all clients are digitally signed by the same set of CA certificates. Commonly, the first CA is an unrelated or independent third party, such as Verisign™ while the second CA is the provider enterprise associated with or providing the enterprise server 104, or software, being executed by the server. The authentication module 124 is operable to establish a secure session using a known protocol, such as Secure Sockets Layer or SSL, Transport Layer Security or TLS, Secure-HTTP, and IP Security or IPSEC, with a client. In one configuration, the secure session is established with a set of first CA issued certificate(s) 120*a-k* using PKI techniques. The server application 132 is an application that provides for itself or for another application authentication, using the set of second CA issued certificates 128, of clients to control client access to rights or privileges. Although FIG. 1 shows the server 104 having first and second CA issued certificates 120*a-k* and 128 in memory, it is to be understood that such storage is unnecessary. Each client commonly forwards its set of certificates to the server 104 during message exchange. Once this message exchange is completed, the server normally removes the received certificates from memory.

The memory 136 of each of the clients 112*a-n* includes different first and second private keys associated with the sets of first and second CA issued certificates, respectively. Each private key corresponds to a public key in a respective one of the sets of first and second CA issued certificates. Also included in the memory is an (client-side) authentication module 144 that communicates with the (server-side) authentication module 124 to establish a secure session and a client application 148 requesting, from the sever application 132, the right or privilege. The client application 148 includes, in its code, certificate information or second CA issued sets of certificates 152 that is commonly not unique to the respective client and corresponds the set of second CA certificates 128.

Figure 3:
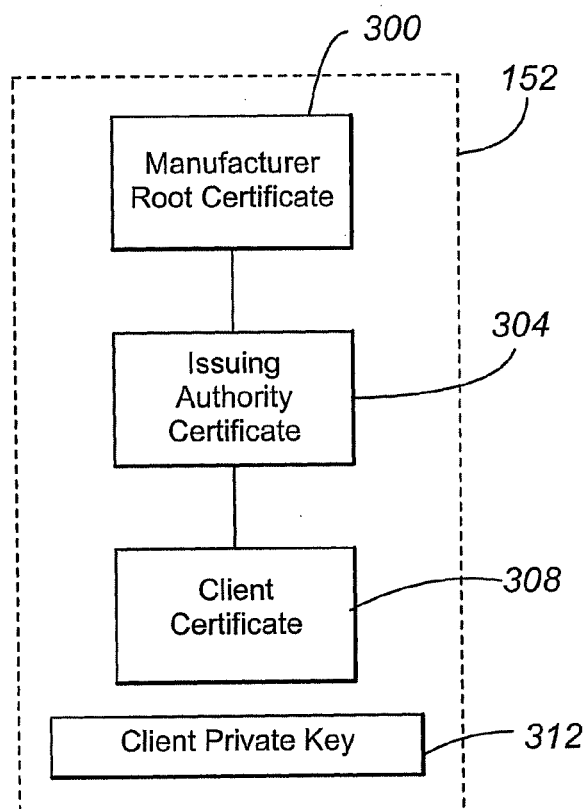
FIG. 3 depicts a chain of trust according to an embodiment of the present invention.

With reference to FIG. 3, the chain of trust used for the embedded sets of second CA issued certificates or certificate information is depicted. The provider enterprise root certificate 300 is at the top of the chain. As noted, the root certificate is both issued to and signed by the private key of the provider enterprise. An issuing authority certificate 304 is issued to the enterprise server 104 and signed with the private key of the provider enterprise. Finally, a different client certificate 308 is issued by the issuing authority 156 of the provider enterprise to each client application 148, which is identified uniquely in the subject field 224 as being associated with its respective client 113*a-n*, and is signed with a private key of the issuing authority 156. Although any attribute or parameter value used in the subject field 224, the value in the field must not be modifiable or modified since the time that the certificate was issued, as that would invalidate the digital signature. Because the certificate is embedded in the code of the client application 148, the subject field 224, unlike the prior art, is not unique for each client. Rather, the subject field 224 is often the same for the various clients in an enterprise network or in different enterprise networks. For example, identification can be made using an attribute of the client application 148. An illustration of a subject field 224 is <applicationName.versionNumber>. With further reference to FIG. 2, the second certificate information (or second set of credentials) 152 includes an encoded copy of the corresponding client's private key 312. The private key is asymmetrically related to a public key in the client certificate 308.

The certificate information 152 is embedded in the code of the client application 148 in a manner that is difficult to compromise. In one configuration, the certificate information 152 is encrypted with a, typically symmetric, key and included in the code. The symmetric key, which may be the symmetric key used to encrypt the private key 312, is obfuscated in the code. Obfuscation refers to "hiding" the symmetric key in a manner that the key is difficult to identify when the machine code is decompiled into source or pseudo-code. Alternatively, the symmetric key can be derived from selected segments, strings, or sequences of the machine code.

Likewise, the root CA and/or issuing authority certificates 300 and 304 may be encrypted and embedded in a like manner in the code of the server application 132. The integrity and security of the certificates can thus be maintained. These certificates are used to verify that the client certificate 308 proffered by a given client was properly issued ultimately by the provider enterprise's root CA. The root CA certificate need not be obfuscated; it simply needs to be not easily modifiable by the administrator of the customer enterprise network. For example, the root CA certificate may be included in a clear-text jar that has been signed.

The client application 148 may be written by programmers at the enterprise of each client and/or at the provider enterprise. In either case, the certificate information 152 is typically embedded in the code by the programmer. When personnel at the provider enterprise embed the certificate information 152, the client application 148 may be physically or electronically delivered to the client enterprise in a secure manner, such as via a secure electronic session.

An exemplary implementation will now be discussed. Assume that the enterprise server 104 is associated with a telecommunications service provider and the first, second, . . . nth client's 112*a-n* are different customers of the provider. Further assume that each client has assigned a certificate to an identity of the enterprise server 104 in a chain of trust having the first (root) CA certificate of the first CA. Finally, assume that the server application 132 is a software development platform, or an Application Programming Interface (API), that enables customers to write software that interfaces with the enterprise provider or its products, such as connecting to the application 132 to monitor and control telephony functions. By issuing, in a chain of trust including the first (root) CA certificate, a certificate including an identity of the enterprise server 104, a trusted relationship can be created between the enterprise server and client. The provider enterprise has determined that a first set of client applications accessing the server application 132 are to be charged a first price while a second set of client applications accessing the server application 132 are to be charged a second, higher price. In the absence of the provider enterprise-initiated chain of trust, the provider enterprise server 104 would be unable to distinguish reliably the first and second sets of client applications from one another and therefore to selectively and effectively charge the first and second sets of client applications differing prices. The provider enterprise-initiated chain of trust, however, permits the server 104 to distinguish effectively client applications from one another and prevent a member of the second set of client applications from improperly being awarded the lower first price. In other words, the present invention simultaneously allows customers to control trust relationships with the sets of first CA issued certificates on the one hand but on the other hand allows the provider enterprise with the set of second CA issued certificates to control trust relationships with customers. The present invention thus permits the creation of two separate and independent trust domains, one of which is client-controlled and identifies individual servers and the other of which is provider enterprise or server-controlled and identifies trusted applications or software entities.

An operational embodiment will now be discussed with reference to FIG. 3.

In step 400, a selected client device 112*a-n* establishes an insecure session with the enterprise server 104 using any suitable protocol, such as the TCP/IP suite of protocols.

In step 404, the client application 148 in the selected client device 112a-n sends a message to the server 104 initiating a trusted application handshake, or an exchange of signals to indicate that data transmission is proceeding successfully. The message contains the certificate information 148 issued by the authentication module 124 in the provider enterprise server 104. This message and the remaining messages are tied to the session by any suitable technique. This could be done by including a session identifier in the message or by receiving the messages in the context of a socket that is tied to the session.

In step 408, the server 104 responds with a random "nonce" value. A nonce value is normally generated using a random or pseudo-random number generator. When message level encryption is desired (e.g., XML encryption), the server 104 will also include a shared secret key, encrypted using the public key from the client certificate 308 in the certificate information 152.

In step 412, the client application 148, in response, creates an assertion, requesting a particular privilege. A special licensing scheme is one example but this mechanism can be used to bypass further authentication or authorization checks. The assertion (which includes the client certificate 308, the nonce value, and a timestamp) is digitally signed using the client private key 312 and sent to the server 104. Logic in the libraries of the client device know how to access the encrypted certificate information 152 embedded in the code of the client application 148. If desired, the assertion could also be encrypted using the secret key from the service.

In step 416, the authentication module 124 and/or server application 124 in the server 104 validates that the client certificate 308 was signed by the issuing authority 156, the client's identity is or is not on the permissions list 160, the timestamp is relatively close to the nonce value is one sent by the server 104, and the signature on the message is valid. Regarding the permissions list 160, the module 124 deems the request to be invalid when the subject 224 in the client certificate 308 is on a revocation or blacklist, and valid when the subject 224 is on a whitelist.

In decision diamond 420, the authentication module 124 and/or server application 124 determines whether or not all validation checks are successful.

When all of the validation checks are successful, the server application 132, in step 424, grants the client the requested right or privilege.

When one or more of the validation checks are unsuccessful, the server application 132, in step 428, denies the client-requested right or privilege.

Another operational embodiment will now be discussed with reference to FIG. 5.

In step 500, a selected client device 112a-n establishes a secure session with the enterprise server 104 using known techniques. Such techniques include, for example, the Secure Sockets Layer or SSL, Transport Layer Security or TLS, Secure-HTTP, and IP Security or IPSEC. When TLS is used to establish a secure tunnel, the appropriate set of first CA issued certificates for the selected client device is employed. Using known protocols to establish a secure session at the outset allows the provider enterprise and customer not to concern themselves with encryption and nonce values. Instead, they can rely on the secure session or tunnel for privacy/replay protection. A simple version can involve a single request/reply. In one configuration, the customer-provided set of first CA issued certificates establishes the secure channel but is not used to authenticate the far end as a trusted application. The certificate information 152 received from the provider enterprise is used for that purpose.

In step 504, the client sends an assertion requesting a particular privilege. The assertion includes a timestamp and a signature for the message. The message is signed using the client private key 312.

In step 508, the server 104 validates that the client certificate 308 was issued using the manufacturer root and issuing authority certificates 300 and 304, the client's identity is or is not on a permissions list 160 (depending on the type of list), the timestamp is recent, and the assertion was signed with the proper client private key 312.

When all of the validation checks are successful, the server application 132, in step 516, grants the client the requested right or privilege.

When one or more of the validation checks are unsuccessful, the server application 132, in step 520, denies the client-requested right or privilege.

The exemplary systems and methods of this invention have been described in relation to a client/server architecture. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a client or server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the logic to access the certificate information 152 embedded in the client application 148 is found only in the enterprise server 104, commonly in the server application 132. The commands would be generated and sent by the server 104 to the client device. In response, the client device would access and provide the client certificate 308 (which is public) and use the client private key 312 to sign one or more messages sent by the client device to the server.

Figure 4:
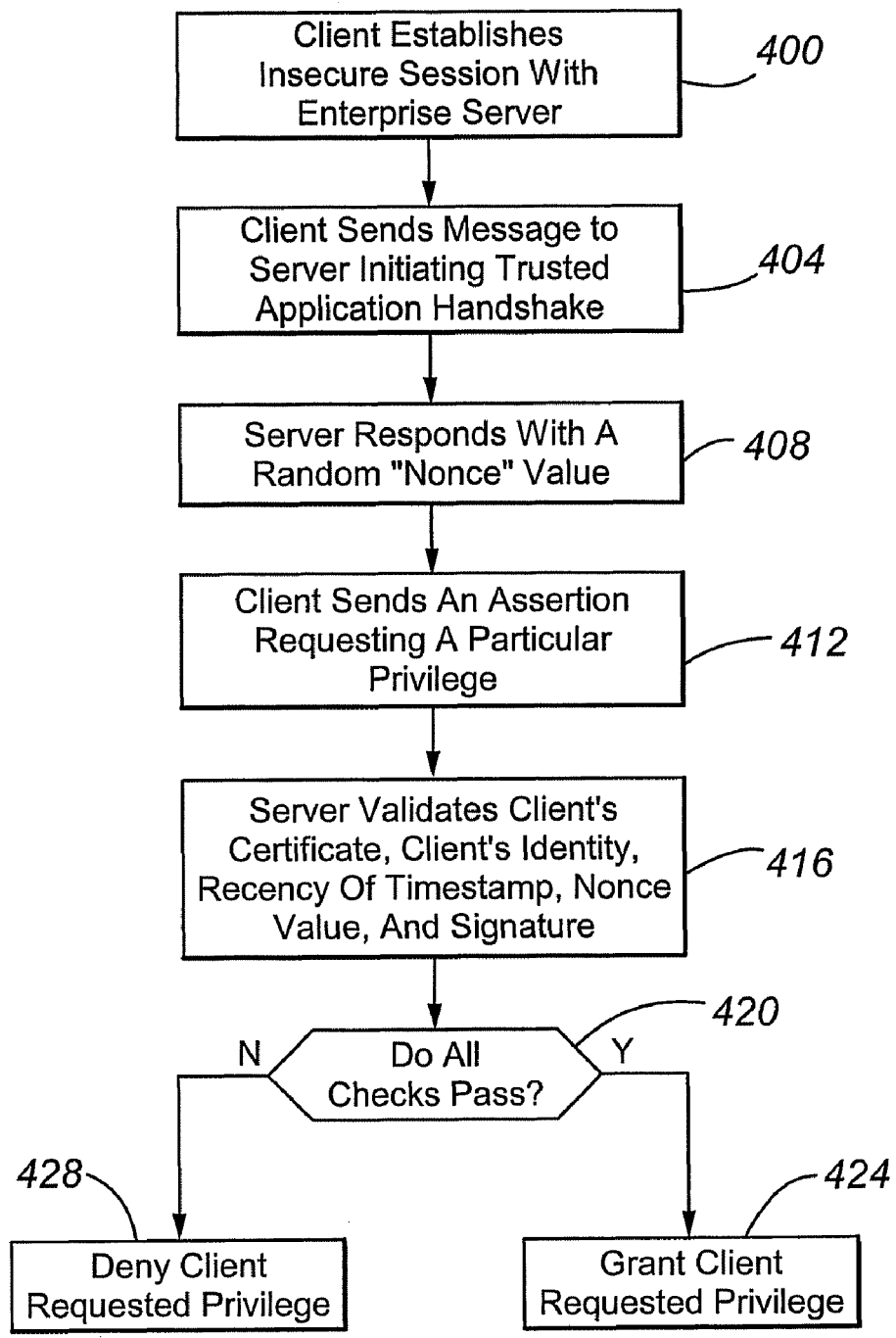
FIG. 4 is a flowchart depicting an authentication process according to an embodiment of the present invention.
Figure 5:
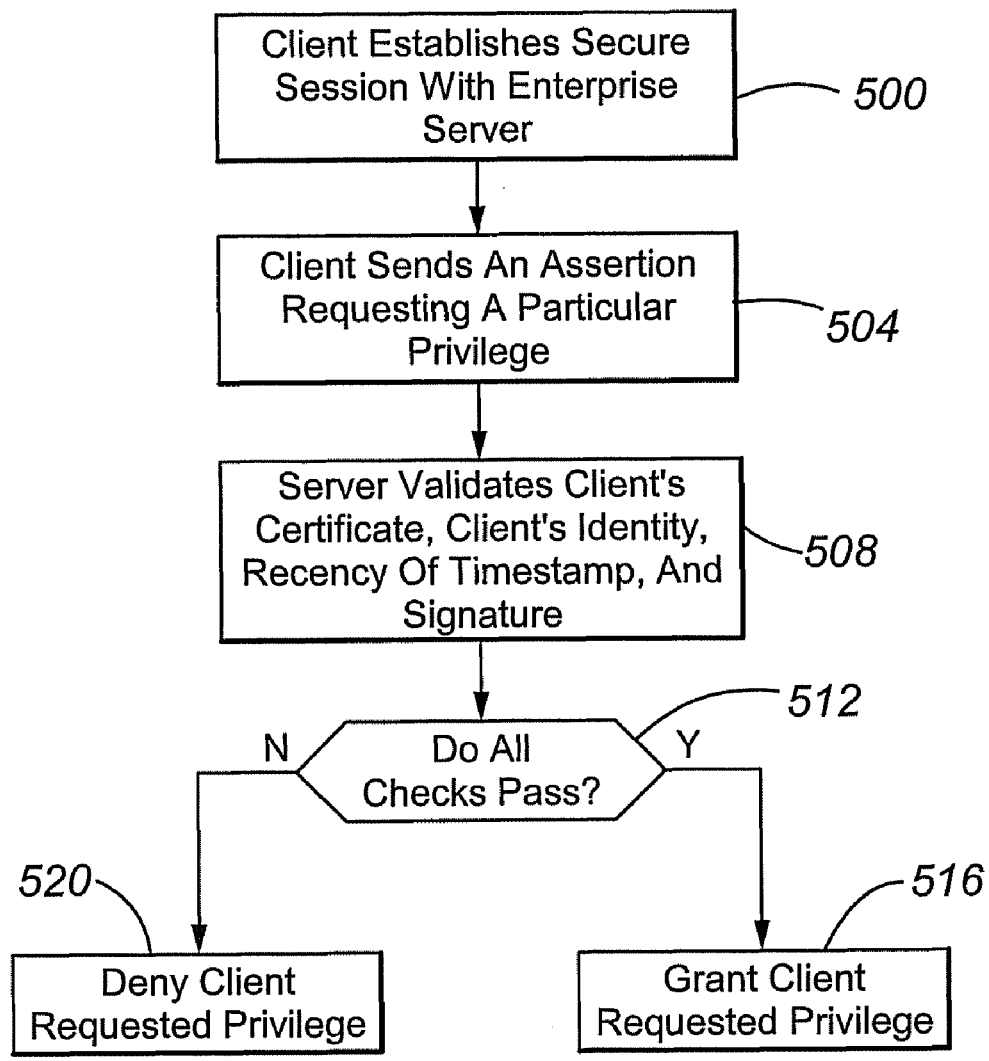
FIG. 5 is a flowchart depicting an authentication process according to another embodiment of the present invention.

In yet another embodiment, the message exchange depicted in FIGS. 4-5 is simplified by eliminating timestamp verification. This produces a four-message exchange to establish an island of trust. The fact that the client device can sign the nonce provided by the server is normally sufficient to validate that the client device can be trusted. Thus under this embodiment, a first message is sent from the client device to the server and includes a request to initiate a procedure. The first message generally does not include data. A second message is sent from the server to the client device and includes a semi-random nonce challenge. A third message is sent from the client device to the server and includes a certificate, the nonce and a digital signature. A fourth message is sent from the server to the client device and includes an acknowledgement if all of the validation checks have passed.

In another embodiment, a list (not shown) of special capabilities is maintained on the server-side for each application name. This list is included in a digitally signed file issued by an authority (e.g., the second CA) owned by the publisher of the server-side software (e.g., provider enterprise). When the client application sends a request, it does not request formally any special rights or privileges. Instead, the server determines an identity of the client application and maps the identity against the digitally signed list to determine what set of rights or privileges are associated with that client application or to which the client application is otherwise entitled. This approach is advantageous in that, if new rights or privileges are granted or temporally extended or existing rights or privileges revoked, no computational component needs to change its code. A new digitally signed, right and/or privilege file is sent by the software provider to the server instead.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations, combinations, and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) retrieving, at a first computational component, a private key embedded in code of a first application, the code of the first application being stored in memory maintained on the first computational component;
   (b) generating, at the first computational component, a request for access to at least one of a right and privilege controlled by a second computational component, the request being digitally signed with the private key;
   (c) receiving, at the second computational component, the request;
   (d) validating the digital signature using a public key associated with the first computational component;
   (e) when validation is successful, providing the first computational component access to the at least one of right and privilege; and
   (f) when validation is not successful, not providing the first computational component access to the at least one of right and privilege;
   wherein the first computational component sends a set of certificates comprising the public key to the second computational component, wherein the second computational component is associated with and provided by at least one of a service and product provider, wherein the first computational component is associated with a customer of the at least one of a service and product provider, and wherein the first computational component or a sub-component thereof has a client certificate issued by an issuing authority associated with the at least one of a service and product provider and digitally signed by a private key of the issuing authority and wherein the client certificate is embedded in the code of the first application, wherein the retrieved private key embedded in the code of the first application is encrypted using a second private key of the issuing authority that is embedded and hidden in the code of the first application.

2. The method of claim 1, wherein the client certificate is issued to the first application and wherein a subject field of the client certificate is not unique to the first computational component.

3. The method of claim 1, wherein the first and second computational components are each a part of a common enterprise network, wherein a chain of trust comprising the client certificate comprises a root certificate of the at least one of a service and product provider digitally signed by a private key of the at least one of a service and product provider, and an issuing authority certificate digitally signed by the private key of the at least one of a service and product provider and wherein the provider's private key, issuing authority's private key, and first computational component's private key are different from one another.

4. The method of claim 3, wherein step (a) comprises the sub-steps:
   (A1) establishing an insecure session between the first and second computational components;
   (A2) sending, by the first computational component, to the second computational component a trusted application handshake; and
   (A3) sending, by the second computational component, to the first computational component a randomly or pseudo-randomly generated nonce value and wherein the validating step (d) comprises the sub-steps:
      (D1) validating that the client certificate associated with the first computational component was validly issued by the issuing authority;
      (D2) validating that an identity associated with the first computational component is not prohibited from receiving the requested access;
      (D3) validating that a timestamp associated with the request is recent relative to a time of receipt of the request;
      (D4) validating that a nonce value in the request is the same as the randomly or pseudo-randomly generated nonce value sent by the second computational component; and
      (D5) validating that a digital signature in the request was signed with the private key of the first computational component.

5. The method of claim 3, wherein step (a) comprises the sub-steps:
   (A1) establishing a secure session between the first and second computational components, the secure session being established using a public set of certificates and corresponding private key of the first computational component issued by an issuing authority different from the issuing authority associated with the at least one of a service and product provider; and wherein the validating step (d) comprises the sub-steps:
      (D1) validating that the public set of certificates associated with the first computational component was validly issued;
      (D2) validating that an identity associated with the first computational component is not prohibited from receiving the requested access;
      (D3) validating that a timestamp associated with the request is recent relative to a time of receipt of the request; and
      (D4) validating that a digital signature in the request was signed with the corresponding private key of the first computational component, wherein the set of public certificates and corresponding private key are not embedded in code.

6. A non-transitory computer readable medium comprising processor-executable instructions operable to perform the steps of claim 1.

7. A method, comprising:
   (a) retrieving, at a first computational component, a private key embedded in code of a first application, the code of the first application being stored in memory maintained on the first computational component;
   (b) generating, at the first computational component, a request for access to at least one of a right and privilege, the request being digitally signed with the private key; and
   (c) sending the digitally signed request to a second computational component, wherein the second computational component is associated with and provided by at least one of a service and product provider, wherein the first computational component is associated with a customer of the at least one of a service and product provider, and wherein the first computational component or a sub-component thereof has a client certificate issued by an issuing authority associated with the at least one of a service and product provider and digitally signed by a private key of the issuing authority, wherein the first computational component sends a set of certificates comprising the public key to the second computational component, wherein the client certificate is embedded in the code of the first application, wherein the retrieved private key embedded in the code of the first application is encrypted using a second private key of the issuing authority that is embedded and hidden in the code of the first application, and further comprising:
- (d) receiving, at the second computational component, the request;
- (e) validating, at the second computational component, the digital signature using a public key associated with the first computational component;
- (f) when validation is successful, providing, by the second computational component, the requested access to the first computational component; and
- (g) when validation is not successful, not providing, by the second computational component, the requested access to the first computational component.

8. The method of claim 7, wherein the first and second computational components are each a part of a common enterprise network, wherein the client certificate is issued to the first application and wherein a subject field of the client certificate is not unique to the first application and first computational component.

9. The method of claim 7, wherein a chain of trust comprising the client certificate comprises a root certificate of the at least one of a service and product provider digitally signed by a private key of the at least one of a service and product provider, and an issuing authority certificate digitally signed by the private key of the at least one of a service and product provider and wherein the provider's private key, issuing authority's private key, and first computational component's private key are different from one another.

10. The method of claim 7, wherein step (a) comprises the sub-steps:
- (A1) establishing an insecure session between the first and second computational components;
- (A2) sending, by the first computational component, to the second computational component a trusted application handshake; and
- (A3) sending, by the second computational component, to the first computational component a randomly or pseudo-randomly generated nonce value and wherein the validating step (d) comprises the sub-steps:
  - (D1) validating that the client certificate associated with the first computational component was validly issued by the issuing authority;
  - (D2) validating that an identity associated with the first computational component is not prohibited from receiving the requested access;
  - (D3) validating that a nonce value in the request is the same as the randomly or pseudo-randomly generated nonce value sent by the second computational component; and
  - (D4) validating that a digital signature in the request was signed with the private key of the first computational component.

11. The method of claim 7, wherein step (a) comprises the sub-steps:
- (A1) establishing a secure session between the first and second computational components, the secure session being established using a public set of certificates and corresponding private key of the first computational component issued by an issuing authority different from the issuing authority associated with the at least one of a service and product provider; and wherein the validating step (d) comprises the sub-steps:
  - (D1) validating that the public set of certificates associated with the first computational component was validly issued;
  - (D2) validating that an identity associated with the first computational component is not prohibited from receiving the requested access;
  - (D3) validating that a timestamp associated with the request is recent relative to a time of receipt of the request; and
  - (D4) validating that a digital signature in the request was signed with the corresponding private key of the first computational component.

12. The method of claim 7, wherein, in response to receiving the request, the second computational component (i) accesses at least one of a right and privilege list issued by the at least one of a service and product provider and comprising, for each first computational component, a corresponding set of rights and privileges and (ii) determines the corresponding set of rights and privileges for the first computational component.

13. A non-transitory computer readable medium comprising processor-executable instructions operable to perform the steps of claim 7.

14. A computational component, comprising:
a first application stored in memory maintained on the computational component, the first application being operable to:
- (a) retrieve a private key embedded in code of the first application;
- (b) generate a request for access to at least one of a right and privilege associated with the first application, the request being digitally signed with the private key; and
- (c) send the digitally signed request to a second computational component, wherein the second computational component is associated with and provided by at least one of a service and product provider, wherein the first computational component is associated with a customer of the at least one of a service and product provider, and wherein the first computational component or a sub-component thereof has a client certificate issued by an issuing authority associated with the at least one of a service and product provider and digitally signed by a private key of the issuing authority, wherein the first computational component sends a set of certificates comprising a public key to the second computational component, wherein the client certificate is embedded in the code of the first application, wherein the retrieved private key embedded in the code of the first application is encrypted using a second private key of the issuing authority that is embedded and hidden in the code of the first application, and wherein the second computational component is operable to:
- (a) receive the request;
- (b) validate the digital signature using a public key associated with the first computational component;
- (c) when validation is successful, provide the requested access to the first computational component; and (d) when validation is not successful, not provide, by the second computational component, the requested access to the first computational component.

15. The component of claim 14, wherein the client certificate is issued to the first application and wherein a subject field of the client certificate comprises an attribute of the first application and an output of the first application.

16. The component of claim 14, wherein a chain of trust comprising the client certificate comprises a root certificate of the at least one of a service and product provider digitally signed by a private key of the at least one of a service and product provider, and an issuing authority certificate digitally signed by the private key of the at least one of a service and product provider and wherein the provider's private key, issuing authority's private key, and first computational component's private key are different from one another.

17. The component of claim 14, wherein operation (a) performed by each of the first and second computational component collectively comprise the sub-operations:
   (A1) establish an insecure session between the first and second computational components;
   (A2) send, by the first computational component, to the second computational component a trusted application handshake; and
   (A3) send, by the second computational component, to the first computational component a randomly or pseudo-randomly generated nonce value and wherein the operation step (d) comprises the sub-operations:
      (D1) validate that the client certificate associated with the first computational component was validly issued by the issuing authority;
      (D2) validate that an identity associated with the first computational component is not prohibited from receiving the requested access;
      (D3) validate that a timestamp associated with the request is recent relative to a time of receipt of the request;
      (D4) validate that a nonce value in the request is the same as the randomly or pseudo-randomly generated nonce value sent by the second computational component; and
      (D5) validate that a digital signature in the request was signed with the private key of the first computational component.

18. The component of claim 14, wherein operation (a) performed by each of the first and second computational component collectively comprise the sub-operations:
   (A1) establish a secure session between the first and second computational components, the secure session being established using a set of public certificates and corresponding private key of the first computational component issued by an issuing authority different from the issuing authority associated with the at least one of a service and product provider; and wherein the validating operation (d) comprises the sub-operations:
      (D1) validate that the public set of certificates associated with the first computational component was validly issued;
      (D2) validate that an identity associated with the first computational component is not prohibited from receiving the requested access;
      (D3) validate that a timestamp associated with the request is recent relative to a time of receipt of the request; and
      (D4) validate that a digital signature in the request was signed with the corresponding private key of the first computational component, wherein neither the set of public certificates nor corresponding public key are embedded in code.

19. The component of claim 14, wherein, in response to receiving the request, the second computational component (i) accesses at least one of a right and privilege list, issued by the at least one of a service and product provider and comprising, for each first computational component, a corresponding set of rights and privileges, and (ii) determines the corresponding set of rights and privileges for the first computational component.

\* \* \* \* \*